United States Patent [19]

White

[11] 3,850,588

[45] Nov. 26, 1974

[54] PRODUCTION OF SYNTHESIS GAS RICH IN CARBON MONOXIDE

[75] Inventor: Robert J. White, Pinole, Calif.

[73] Assignee: Chevron Research Company, San Francisco, Calif.

[22] Filed: Feb. 14, 1973

[21] Appl. No.: 332,865

Related U.S. Application Data

[63] Continuation-in-part of Ser. Nos. 34,834, May 5, 1970, Pat. No. 3,759,677, and Ser. No. , , Continuation-in-part of Ser. No. 39,116, May 20, 1970, abandoned, and Ser. No. , , Continuation-in-part of Ser. No. 134,067, April 14, 1971, abandoned.

[52] U.S. Cl. .................. 48/209, 48/210, 252/373, 423/415
[51] Int. Cl. .............................................. C10j 3/00
[58] Field of Search...... 48/209, 111, 197 R, 197 A, 48/210; 201/21, 25, 2.5; 423/415

[56] References Cited
UNITED STATES PATENTS

| | | | |
|---|---|---|---|
| 3,020,715 | 2/1962 | Thomsen...................... | 48/209 UX |
| 3,436,314 | 4/1969 | Leonor........................... | 48/209 UX |
| 3,692,506 | 9/1972 | Johnson............................... | 48/210 |

FOREIGN PATENTS OR APPLICATIONS

855,247   11/1960   Great Britain...................... 423/215

Primary Examiner—Joseph Scovronek
Attorney, Agent, or Firm—G. F. Magdeburger; R. H. Davies; J. J. De Young

[57] ABSTRACT

A carbon-monoxide-rich synthesis gas is produced by feeding a mixture of carbon dioxide and an organic material to a reaction zone maintained at a temperature in the range 1,000° to 3,000°F. Suitable organic materials are compounds composed of carbon, hydrogen and oxygen in which the oxygen content is at least 10 weight percent. Alkali metal carbonates catalyze the reaction.

12 Claims, No Drawings

PRODUCTION OF SYNTHESIS GAS RICH IN CARBON MONOXIDE

CROSS REFERENCES

This application is a continuation-in-part of my applications Ser. No. 34,834, filed May 5, 1970 now U.S. Pat. No. 3,759,677, issued 9/18/73, Ser. No. 39,116, filed May 20, 1970 now abandoned, and Ser. No. 134,067, filed April 14, 1971 now abandoned. Application Ser. No. 134,067 is abandoned herewith in favor of this application.

BACKGROUND OF THE INVENTION

The present invention relates to the production of synthesis gas. More particularly, it relates to the production of synthesis gas rich in carbon monoxide by the reaction of carbonaceous material with carbon dioxide.

The term "synthesis gas" is used herein to mean a gas comprising carbon monoxide and hydrogen. The synthesis gas produced in the process of the present invention is mainly carbon monoxide, that is, the gas produced usually contains more than 50 volume percent carbon monoxide on a dry-gas basis. Often, the carbon monoxide content is 70 volume percent or more on a dry-gas basis.

There are a wide variety of uses for synthesis gas (see, for example, *Encyclopedia of Chemical Technology*, Second Edition, Kirk-Othmer, Volume 10, Pages 353–442). Synthesis gas, rich in carbon monoxide, is especially useful for the synthesis of methanol. It is also useful as a feed for a Fischer-Tropsch synthesis for the production of hydrocarbons. Another use is the production of methane which can be directly burned as a fuel gas or the methane can be combined with light hydrocarbons for the production of enriched fuel gas. Carbon dioxide, if present in the foregoing, may or may not be removed as deemed desirable for the usual reasons known in the art.

Various methods have been suggested for the production of synthesis gas or hydrogen-rich gas mixtures. Among these methods are steam-hydrocarbon reforming, partial oxidation of hydrocarbons, Lurgi heavy hydrocarbons gasification, the traditional steam, red-hot coke reaction, and modified methods of reacting carbonaceous matter with steam and oxygen, such as described in U.S. Pat. No. 1,505,065.

Production of hydrogen and carbon monoxide gases from waste substances produced in the manufacture of paper from wood chips and the like has been discussed in the literature, as for example, in U.S. Pat. No. 3,317,292. In the manufacture of paper, wood chips are digested, for example with an aqueous calcium sulfide liquid, thereby leaving wood pulp behind. As disclosed in U.S. Pat. No. 3,317,292, the waste substances containing lignin-derived organic compounds can be converted to a gas mixture comprising hydrogen by contacting the waste material with steam in a reaction zone at an elevated temperature at least the order of several hundred degrees centigrade. The sulfite waste liquor produced in the manufacture of paper from wood chips and the like is a relatively well-defined waste material consisting mostly of lignin-type organic compounds and certain inorganic components, including at least five weight percent sulfur, calculated as the element sulfur but present usually in the form of sulfur compounds.

The use of catalysts such as potassium carbonate has been disclosed for the reaction of carbon with steam to form hydrogen, carbon dioxide and also carbon monoxide. The reaction is discussed, for example, in the *Journal of the American Chemical Society*, Vol. 43, p. 2,055 (1921). However, the use of catalysts such as potassium carbonate to catalyze the reaction of organic material containing substantial amounts of oxygen, particularly waste or garbage-type material, with steam or with carbon dioxide to form carbon monoxide does not appear to be disclosed or suggested in the prior art.

U.S. Pat. No. 3,471,275 discloses a method for converting refuse or garbage-type material to gases such as gases rich in hydrogen and also containing CO. According to the process disclosed in U.S. Pat. No. 3,471,275, the refuse is fed to a retort and heated therein to a temperature between about 1,650°F. and 2,200°F. The retort is externally heated. According to the U.S. Pat. No. 3,471,275 process, steam is not generally added to the retort. Any steam which is added to the retort according to the process disclosed in the U.S. Pat. No. 3,471,275 is added to the bottom of the retort so that steam would flow countercurrent to the waste material which is introduced to the retort at the top of the retort. No catalyst is used in the U.S. Pat. No. 3,471,275 process and $CO_2$ is not added to the reaction zone to form CO.

SUMMARY OF THE INVENTION

According to the present invention, a process is provided for producing carbon-monoxide-rich synthesis gas which comprises contacting an organic feed material in which the organic feed comprises chemically combined carbon, hydrogen and oxygen and the oxygen is at least 10 weight percent thereof, and preferably containing less than five weight percent sulfur, with added carbon dioxide at an elevated temperature in a reaction zone.

The present invention is based on my finding that carbon dioxide reacts with hydrocarbonaceous material containing at least 10 weight percent of combined oxygen as noted at a surprisingly fast reaction rate to form carbon monoxide. Carbon dioxide is frequently considered to be merely a diluent or end product in a reaction system. However, in the present invention carbon dioxide is used as a reactant to convert oxygen-containing material to valuable synthesis gas, particularly carbon-monoxide-rich synthesis gas.

As described further hereinbelow, a preferred embodiment of the present invention is based on my additional finding that solid municipal wastes containing the requisite amount of oxygen are particularly suitable feedstocks for reaction in the process of the present invention.

A principal reaction of the present invention can be schematically illustrated as follows:

Reaction A: 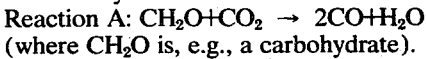

(where $CH_2O$ is, e.g., a carbohydrate).

Reaction A proceeds at a much faster reaction rate than, for example, the reaction of $CO_2$ with carbon to yield carbon monoxide. The reaction, as schematically indicated by equation A above, is not believed to proceed as rapidly as the reaction of water with the oxygen-containing carbonaceous material. A concurrent reaction of evolved water with the feed is therefore also experienced in my process. The reaction of the organic feed as herein with $CO_2$ proceeds at a sufficiently rapid rate to be attractive for the conversion of certain oxygen-containing carbonaceous material, particularly when large quantities of $CO_2$ are easily available for use as a reactant.

The amount of $CO_2$ used in the reaction is preferably at least 30 standard cubic feet of $CO_2$ per pound of organic feed material. Usually the amount of $CO_2$ added is between 10 and 300 standard cubic feet per pound of organic feed material.

It is particularly preferred to carry out the reaction of $CO_2$ with the oxygen-containing organic feed material in the presence of an alkali metal catalyst, preferably a carbonate, such as potassium carbonate or sodium carbonate. I have found that a catalyst such as potassium carbonate greatly accelerates the reaction rate of the carbon dioxide with the oxygen-containing organic feed material.

The reason for the fast reaction rate for the formation of synthesis gas in the process of the present invention is not completely understood, but it is believed that an important factor is the oxygen content of the organic feed material. The organic feed material, which in this specification is to be understood to contain hydrogen as well as carbon, must contain at least 10 weight percent oxygen and is, in general, in the range 10 to 60 weight percent. This requirement is in contrast to the essential absence of combined oxygen in hydrocarbon feedstocks normally used in synthesize gas-producing processes such as steam-light hydrocarbon reforming or hydrocarbon partial oxidation. The presence of oxygen in the organic feed material in the process of the present invention may contribute to the relatively fast reaction rate by making the feed material more susceptible to reaction with $CO_2$ to produce CO than in the case of hydrocarbon material containing little or no oxygen. I have found that it is particularly preferable in the process of the present invention to produce synthesis gas from organic feed material containing at least 20 weight percent oxygen and still more preferably between about 35 and 60 weight percent oxygen.

I have also found that organic feed material containing the oxygen substantially in the form of polyhydroxylated compounds is particularly advantageous from the standpoint of high reaction rates with carbon dioxide and steam to form synthesis gas. By organic feeds containing oxygen in the form of polyhydroxylated compounds, as used herein, is meant to include carbohydrates, such as cellulose and sugars.

The oxygen and the hydrogen content in the organic feed material are to be understood as chemically combined oxygen and hydrogen, i.e., oxygen and hydrogen which are connected through one or more chemical bonds to the carbon present in the organic feed material. Preferably the oxygen is bonded at least to carbon.

It is preferred in the process of the present invention to use an organic oxygen-containing feed material which contains less than 5 weight percent sulfur. The sulfur is calculated as elemental sulfur, although for the undesired high-sulfur-content feedstocks the sulfur is usually present as a compound, as for example an organic sulfur compound or an inorganic sulfur compound present in the feed material. Thus, it is to be understood that the organic feed material contacted with carbon dioxide or carbon dioxide and steam according to the process of the present invention is preferably substantially free of inorganic or organic sulfur compounds, i.e., that the feed contains less than 5 weight percent sulfur either as sulfur chemically combined with the organic feed material or as inorganic sulfur compounds physically mixed with the organic feed material. Feeds such as Kraft black liquor produced as a waste material in the manufacture of paper pulp are usually not suitable in the process of the present invention because of the relatively high content of sulfur compounds in the Kraft black liquor. It is undesirable to have substantial amounts of sulfur in the feed to the reaction zone in the process of the present invention because of the increased reactor cost and, more particularly, because of the increased problems in removing sulfur compounds from the synthesis gas produced in the reactor. It is preferred that the sulfur content of the organic feed material be below about 3 weight percent sulfur.

Among the alkali metal catalysts, potassium carbonate is preferred. Other catalysts comprising Group VIII metals such as nickel can be used in the process of the present invention, but nickel catalysts have been found to be relatively susceptible to sulfur poisoning even at relatively low sulfur contents for the organic feedstock of the process of the present invention. Nickel catalysts are not soluble in water, and thus cannot be readily recovered from the ash product from the reaction zone for reuse as a catalyst such as can be done with an alkali metal catalyst. The alkali metal catalysts include lithium, sodium, potassium, rubidium and cesium. Preferably, the alkali metal is added to the reaction zone by contacting the feed to the reaction zone with a solution of a salt of the alkali metal catalyst. The salts of the alkali metal catalyst include salts such as sulfates and chlorides. Although it is preferred to add the alkali metal catalyst to the reaction zone in the form of a carbonate, it is suitable to add the catalyst in other forms such as hydroxides or as acetates, formates, sulfates, chlorides or other alkali metal salts. It is believed these compounds will tend to be converted to carbonates in the reaction zone.

I have found that particularly suitable and representative organic feed materials for the process of the present invention includes lignite, wood, and solid waste material, including material commonly referred to as garbage. I have found that high reaction rates are obtained in the process of the present invention for the conversion of solid waste material to synthesis gas. The term "solid waste material" or "solid waste" is used herein to include solid municipal waste or common garbage, sewage, industrial waste such as sawdust, and agricultural waste such as corn husks or other discarded cellulosic material.

According to a particularly preferred embodiment of the present invention, the feed material is solid municipal waste including what is commonly referred to as garbage, but excluding sewage. This solid municipal waste, consisting primarily of common garbage, is particularly preferred. I have found that using simulated solid municipal waste, good conversion rates to synthesis gas can be obtained in the process of the present invention. Sanitary valuable products are also produced making possible the alleviation of an important disposal and pollution problem, the increasing amounts of solid municipal waste which must be disposed of daily. In addition, I have determined that the amount of solid municipal waste for a number or urban areas is satisfactory from a feed requirement standpoint for the production of synthesis gas to be used in the various processes mentioned previously.

A catalyst, as noted above, may be employed in my process, but is not a necessary requirement. When a catalyst is employed, a satisfactory amount, based upon the weight of the organic material charged to the reaction zone, is in the range from 1 to 20 percent (calculated as potassium carbonate, $K_2CO_3$, or the stoichiometric equivalent, i.e., for each 100 parts by weight of organic feed an amount of 1 or more of the alkali metal carbonates in the range 0.007 to 0.15 mols). Preferably, the amount of catalyst is in the range 0.015 to 0.1 mols per 100 parts (weight) of the organic feed.

A wide range of temperature is satisfactory for use in the process herein. Thus, the temperature in the reaction zone may be in the range between 1,000° and 3,000°F. and the process is operable and a useful result is achieved. Preferably, the temperature employed is in the range 1,000° to 2,000°F., most preferably the temperature is in the range 1,200° to 1,800°F.

The reaction system pressure is not a prime variable in the practice of the process herein. Therefore, the pressure may vary over a wide range and the results obtained will be satisfactory. Ordinarily, the system pressure employed will be in the range from atmospheric to 200 atmospheres. Preferably, because carbon dioxide is included in the process feed, a superatmospheric pressure will be employed. Superatmospheric pressures employed herein are desirably in the range 4 to 150 atmospheres, more preferably from 8 to 50 atmospheres.

In the process of the present invention, a molecular oxygen-containing gas, such as air or molecular oxygen, may also be introduced to the reaction zone to burn a portion of the organic feed material to furnish heat. Heat for the reaction can also be supplied by preheating the $CO_2$ fed to the reaction zone to a sufficiently high temperature to supply the required amount of heat for the endothermic reaction of $CO_2$ plus organic material to form synthesis gas. The endothermic heat requirement for the reaction of carbon dioxide with oxygen-containing organic material to produce carbon monoxide plus $H_2O$ is about twice that for reaction of steam with oxygen-containing organic material. Thus, the basic synthesis gas generation reaction of the present invention is particularly advantageously carried out if a source of large quantities of hot $CO_2$ is available, for example, hot flue gas. Hot $CO_2$ can supply a portion or all of the heat requirements for the reaction.

EXAMPLES 1-2

In these examples, lignite was maintained at 1,200°F., both in the presence of added carbon dioxide and without added carbon dioxide. The 1,200°F. temperature was maintained until the reaction subsided, that is to say, until the reaction, for all practical purposes, was completed. Other pertinent information regarding the examples and the results are as follows:

TABLE

| Reactants | Example 1 | Example 2 |
| --- | --- | --- |
| Lignite, gr. | 100 | 100 |
| $CO_2$ added | No | Yes[1] |
| Reaction Duration, Hrs. | ~1 | ~24 |

TABLE-Continued

| Product | Example 1 | Example 2 |
| --- | --- | --- |
| $H_2O$, gr. | 7.8 | 7.8 |
| Oil, gr. | 7.4 | 7.4 |
| $CH_4$, gr. | 2.3 | 2.3 |
| $C_2H_6$, gr. | 0.5 | 0.5 |
| CO, gr. | 8.8 | 240.0 |
| $CO_2$, gr. | 12.5 | — |
| $H_2$, gr. | 0.7 | 1.0 |
| Char | 60.0 | 10 |

[1] The amount of added carbon dioxide was in the ratio of 100 standard cubic feet of carbon dioxide per pound of organic feed.

From a comparison of the above examples, it is evident that the addition of carbon dioxide gas to the reaction system resulted in a 28-fold increase in CO production, and about an 83 percent reduction in the char. Clearly, the addition of carbon dioxide to an organic feed, as herein, is advantageous.

When an alkali metal carbonate catalyst is included in the charge to the reaction zone, improvements in the conversion rate of the organic material are experienced. Higher conversion rates, of course, mean that for a given reactor volume, more feed can be converted per unit of time.

Although various embodiments of the invention have been described, it is to be understood that they are meant to be illustrative only and not limiting. Certain features may be changed without departing from the spirit or scope of the present invention. It is apparent that the present invention has broad application to the production of carbon monoxide-containing gases from organic feed material containing a substantial amount of chemically combined oxygen by reacting the organic feed material with carbon dioxide. Accordingly, the invention is not to be construed as limited to the specific embodiments or examples discussed but only as defined in the appended claims or substantial equivalents of the claims.

What is claimed is:

1. In a process for the production of a synthesis gas rich in carbon monoxide which comprises reacting in a reaction zone maintained at an elevated temperature a solid organic feed material with carbon dioxide, the improvement comprising introducing into a reaction zone maintained at a temperature from about 1,000° to 2,000°F. a solid organic feed comprising chemically combined carbon, hydrogen and oxygen with said combined oxygen comprising at least 20 weight percent of the solid organic feed and wherein for each pound of the organic feed introduced into the reaction zone an amount of carbon dioxide in the range from 10 to about 300 standard cubic feet is introduced therein.

2. A process as in claim 1, wherein at least 30 standard cubic feet of carbon dioxide are fed to the reaction zone per pound of organic feed.

3. A process as in claim 2, wherein the organic feed is solid waste selected from the group consisting of municipal waste, industrial waste, and agricultural waste.

4. A process as in claim 2, wherein the feed is municipal waste.

5. A process as in claim 1 wherein the reaction is catalysed by an alkali metal carbonate, and wherein there is present for each 100 parts by weight of the organic feed an amount of the catalyst in the range from 0.007 to 0.15 mols.

6. A process as in claim 1 wherein:
a. the amount of carbon dioxide is at least 30 standard cubic feet per pound of the organic feed;
b. the organic feed contains less than 5 weight percent of sulfur;
c. the combined oxygen content of the organic feed is in the range from 20 to 60 weight percent; and
d. the pressure in the reaction zone is in the range from 1 to 200 atmospheres.

7. A process as in claim 6 wherein:
a. the combined oxygen content of the feed is at least 20 weight percent;
b. the temperature is in the range from about 1,200° to 1,800°F.; and
c. the pressure is in the range from 4 to 150 atmospheres.

8. A process as in claim 5, wherein the amount of catalyst is in the range from 0.015 to 0.1 mols.

9. A process as in claim 6, wherein the pressure is in the range 8 to 50 atmospheres.

10. A process as in claim 6, wherein the combined oxygen content of the feed is in the range from about 35 to 60 weight percent.

11. A process as in claim 1, wherein the feed is a carbohydrate.

12. A process for producing synthesis gas rich in carbon monoxide, which comprises reacting a solid organic waste-material feed with carbon dioxide in a reaction zone; wherein said feed and carbon dioxide are introduced into the zone and reacted at a temperature in the range from about 1,000° to 2,000°F, said feed comprising chemically combined carbon, hydrogen and oxygen, and said combined oxygen being at least 20 weight percent of said feed, and wherein for each pound of said feed introduced into the reaction zone an amount of carbon dioxide in the range from 10 to about 300 standard cubic feet is introduced therein.

* * * * *